United States Patent
Carter et al.

(10) Patent No.: US 9,080,683 B2
(45) Date of Patent: Jul. 14, 2015

(54) METHOD AND APPARATUS FOR PARTIAL STROKE TESTING OF AN EMERGENCY SHUTDOWN VALVE

(75) Inventors: Perry K. Carter, Ames, IA (US); Riyaz M. Ali, Austin, TX (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 272 days.

(21) Appl. No.: 13/029,939

(22) Filed: Feb. 17, 2011

(65) Prior Publication Data

US 2012/0215488 A1 Aug. 23, 2012

(51) Int. Cl.
| | |
|---|---|
| H04W 24/00 | (2009.01) |
| H04W 4/00 | (2009.01) |
| G06F 15/00 | (2006.01) |
| F16K 37/00 | (2006.01) |
| G05B 19/042 | (2006.01) |
| G05B 19/46 | (2006.01) |
| H04L 29/08 | (2006.01) |
| H04W 76/02 | (2009.01) |

(52) U.S. Cl.
CPC ........ *F16K 37/0075* (2013.01); *G05B 19/0428* (2013.01); *G05B 19/46* (2013.01); *H04L 67/12* (2013.01); *H04W 76/02* (2013.01)

(58) Field of Classification Search
CPC F16K 37/0075; G05B 19/0428; G05B 19/46; H04L 67/12; H04W 76/02
See application file for complete search history.

(56) References Cited

U.S. PATENT DOCUMENTS

| | | | | |
|---|---|---|---|---|
| 6,186,167 | B1 * | 2/2001 | Grumstrup et al. | 137/487.5 |
| 7,010,294 | B1 * | 3/2006 | Pyotsia et al. | 455/420 |
| 7,828,008 | B1 * | 11/2010 | Beckman et al. | 137/487.5 |
| 8,072,343 | B2 * | 12/2011 | Flanders | 340/679 |
| 2004/0199351 | A1 * | 10/2004 | Ott et al. | 702/108 |
| 2005/0155644 | A1 * | 7/2005 | Woollums | 137/3 |
| 2006/0219299 | A1 * | 10/2006 | Snowbarger | 137/487.5 |
| 2007/0018127 | A1 | 1/2007 | Seberger | |
| 2007/0107777 | A1 * | 5/2007 | Catron | 137/2 |
| 2008/0236679 | A1 * | 10/2008 | Esposito | 137/487.5 |
| 2009/0097415 | A1 * | 4/2009 | Shepard et al. | 370/254 |
| 2009/0121868 | A1 * | 5/2009 | Flanders | 340/540 |
| 2009/0292572 | A1 | 11/2009 | Alden et al. | |

(Continued)

FOREIGN PATENT DOCUMENTS

EP    2 161 640 A2    3/2010

OTHER PUBLICATIONS

International Search Report for PCT/US201/065163, mailed Mar. 23, 2012.

(Continued)

*Primary Examiner* — Mohamed Charioui
*Assistant Examiner* — John Kuan
(74) *Attorney, Agent, or Firm* — Marshall, Gerstein & Borun LLP

(57) ABSTRACT

A method for conducting a partial stroke test of an emergency shutdown valve includes receiving a request to initiate the partial stroke test from a user interface or another source, establishing a direct or an indirect wireless communication link with the emergency shutdown valve, and generating one or more commands of a digital industrial automation protocol to be transmitted to the emergency shutdown valve via the wireless communication link, so that a partial stroke test of the emergency shutdown valve is initiated in response to these commands.

23 Claims, 5 Drawing Sheets

(56) References Cited

U.S. PATENT DOCUMENTS

| | | |
|---|---|---|
| 2009/0311975 A1* | 12/2009 | Vanderaa et al. ............ 455/90.3 |
| 2010/0004761 A1 | 1/2010 | Flanders et al. |
| 2010/0074156 A1* | 3/2010 | Tapperson et al. ............ 370/310 |
| 2010/0145476 A1* | 6/2010 | Junk et al. ........................ 700/7 |
| 2012/0031494 A1* | 2/2012 | Lymberopoulos ................ 137/1 |
| 2012/0041582 A1* | 2/2012 | Wallace ........................ 700/109 |
| 2012/0046911 A1* | 2/2012 | Mathiowetz et al. ......... 702/184 |
| 2012/0093242 A1* | 4/2012 | Wallace et al. ............... 375/259 |

OTHER PUBLICATIONS

Written Opinion for PCT/US2011/065163, mailed Mar. 23, 2012.

* cited by examiner

METHOD AND APPARATUS FOR PARTIAL STROKE TESTING OF AN EMERGENCY SHUTDOWN VALVE

FIELD OF TECHNOLOGY

The present disclosure relates generally to process control networks and, more particularly, to initiating and monitoring a partial stroke test of an emergency shutdown valve.

DESCRIPTION OF THE RELATED ART

Industrial process control systems often include safety instrumented systems (SIS) that generally incorporate an emergency shutdown (ESD) system to transition a shutdown valve to a safe state in the event of a device failure, power failure, or other emergency. A typical ESD system includes a shutdown controller (e.g., a Programmable Logic Controller (PLC), a digital valve controller (DVC), a logic solver) and a solenoid valve to actuate the shutdown valve. In emergencies, the ESD valve transitions to the safe state such as the fully open position or the fully closed position, for example. Usually, however, the ESD shutdown valve remains idle, either permitting a fluid to flow freely through a pipeline, or shutting off all fluid flow through the pipeline.

To ensure that an ESD valve can function properly, process control system operators periodically test the corresponding ESD system by running a stroke test that partially or completely opens or closes the ESD valve. For simplicity, all such tests are referred to herein as "partial stroke tests," regardless of whether the ESD valve is closed only partially or completely. Operators often approach ESD valves during partial stroke testing to listen for abnormal sounds, make sure the movement of the actuator appears smooth, and otherwise observe how the valve operates. In some cases, operators also collect data that describes the progress of the partial stroke test (e.g., valve positioning measured at certain times).

SUMMARY

A partial stroke test of an emergency shutdown (ESD) valve is initiated from a device coupled to an ESD system that includes the ESD valve via at least one wireless communication link. In response to receiving a command to initiate a partial stroke test, an ESD system causes the stem of the ESD valve to move to one or several new positions. In some implementations, the ESD system also includes one or several sensors to determine operational parameters of the ESD valve and/or parameters of the environment in which the ESD valve operates (e.g., the flow rate through the ESD valve, fluid pressure upstream of the ESD valve, fluid pressure downstream of the ESD valve, fluid temperature).

In some embodiments, an operator uses a portable device such as a smartphone, a general-purpose personal digital assistant (PDA), or a portable communicator for use in a process control system to establish a wireless link to the ESD system and transmit one or several commands to the ESD system so as to initiate a partial stroke test. In some embodiments, positioning data and/or other parameters are reported to the portable device via the wireless communication link during the execution of the partial stroke test or following the completion of the partial stroke test. In this manner, the operator can collect historical data as well as create documentation that reflects the history of partial stroke testing.

The portable device communicates with the ESD system using a general-purpose wireless communication protocol such as Bluetooth, according to some embodiments. The portable device may include software components that layer commands of an industrial automation protocol such as HART™, Profibus®, Foundation Fieldbus™, etc. via the Bluetooth link. The portable device may further include a software system for controlling and diagnosing a valve such as ValveLink™ software, for example.

In another embodiment, an operator accesses the ESD system via a wireless industrial automation network using a workstation coupled to the industrial automation network. The ESD system in one such embodiment is communicatively coupled to a wireless protocol adapter that enables the ESD system to receive and/or transmit commands of a wireless industrial automation protocol used by the wireless network such as WirelessHART® (ratified by International Electrotechnical Commission as IEC 62591 in April, 2010), for example.

Depending on the embodiment, the ESD valve is disposed in the same housing as the controller that controls the positioning of the ESD valve to define a common ESD assembly, or in separate housing (coupled to the controller via a wired or wireless communication link). If desired, the ESD assembly may also include position sensors, pressure sensors, temperature sensors, etc. In another embodiment, the ESD system is coupled to one or several sensors disposed outside the ESD assembly.

In various embodiments, a set of computer-executable instructions for running a partial stroke test is stored on the portable device that communicates with the ESD system via a direct wireless link, a workstation that communicates with the ESD system via one or several wireless links of a wireless communication network, or in the ESD system. For example, in one such embodiment, the controller of the ESD system includes a memory to store a set of instructions for executing a partial stroke test and a processor to execute these instructions in response to a triggering event such as a command received via a wireless communication link.

DETAILED DESCRIPTION

In various embodiments of the present disclosure, an operator or an automated system initiates a partial stroke test of an ESD valve via a wireless communication link. Accordingly, partial stroke testing can be initiated without providing wired access to the valve or relying on a wired network connection between the valve and a device from which the test is initiated. The operator may also conduct the test after the test has been initiated, if desired. For example, the operator may monitor the progress of the partial stroke using process data reported from the ESD valve via the wireless communication link, control the extent of the test (e.g., the percentage of the maximum open position to which the valve should be moved), temporarily suspend the test, abort the test, etc. In an example implementation, the wireless communication link is a direct wireless link between an ESD system that includes the ESD valve and a portable communication device. The wireless communication link in another example implementation is a part of a wireless communication network, so that the ESD valve and/or the ESD system operates as a wireless network node.

Figure 1A:
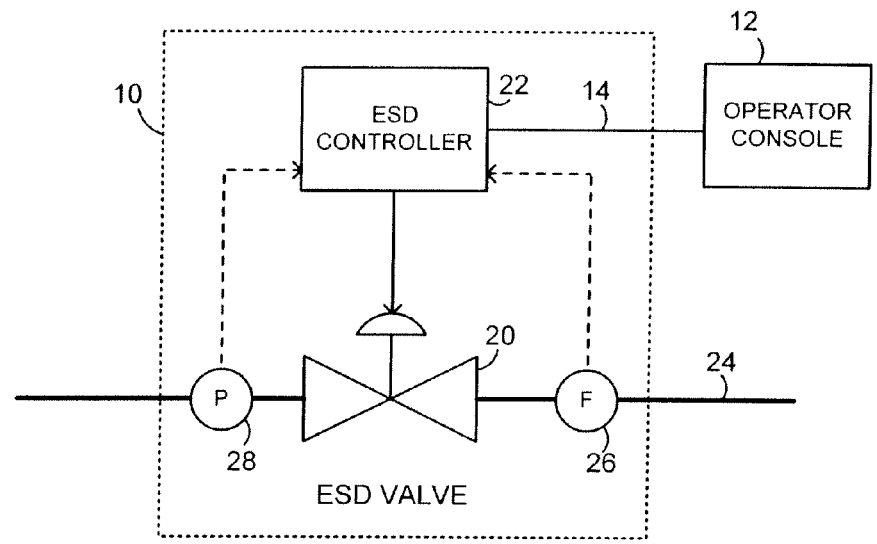
FIG. 1A is a diagram of a known system in which a partial stroke test of an ESD valve is initiated using an operator console coupled to the ESD valve via a wired link.

For clarity, prior to discussing the techniques for wirelessly initiating and/or conducting a partial stroke test of an ESD valve in more detail, several prior art systems are discussed first. Referring to FIG. 1A, an ESD assembly 10 is coupled to an operator console 12 via a wired link 14. The ESD assembly 10 includes an ESD valve 20 disposed in a pipeline 24 and controlled by an ESD controller 22. For example, the ESD controller supplies an electrical or pneumatic signal to actuate a valve stem of the ESD valve 20, so that the ESD valve 20 opens or closes to the desired percentage. The ESD assembly 10 further includes one or several sensors for measuring operating parameters. In particular, the ESD assembly 10 depicted in FIG. 1A includes a flowmeter 26 disposed upstream of the ESD valve 20 and a pressure sensor 28 disposed downstream of the ESD valve 20.

The operator console 12 typically includes an input device such as pushbuttons, a keyboard, a mouse, a trackball, etc. and an output device such as a monitor or lights. To initiate a partial stroke test of the ESD valve 20, an operator physically approaches the operator console 12 and types in (or otherwise enters) commands to interact with the ESD controller 22. Because operators typically wish to observe the ESD valve 20 during testing, the operator console 12 is disposed close to the ESD controller 22. Moreover, providing a long wired link between the ESD assembly 10 an the operator console 12 may be expensive and difficult to implement, and thus placing the operator console 12 in a control room remote to the ESD assembly 10 is usually impractical. As a result, the operator console 12 is often exposed to the elements, corrosive or abrasive particles, extreme temperatures, vibration, etc. Also, some locations in which an ESD valve is installed may be difficult or dangerous for a human operator to reach.

Figure 1B:
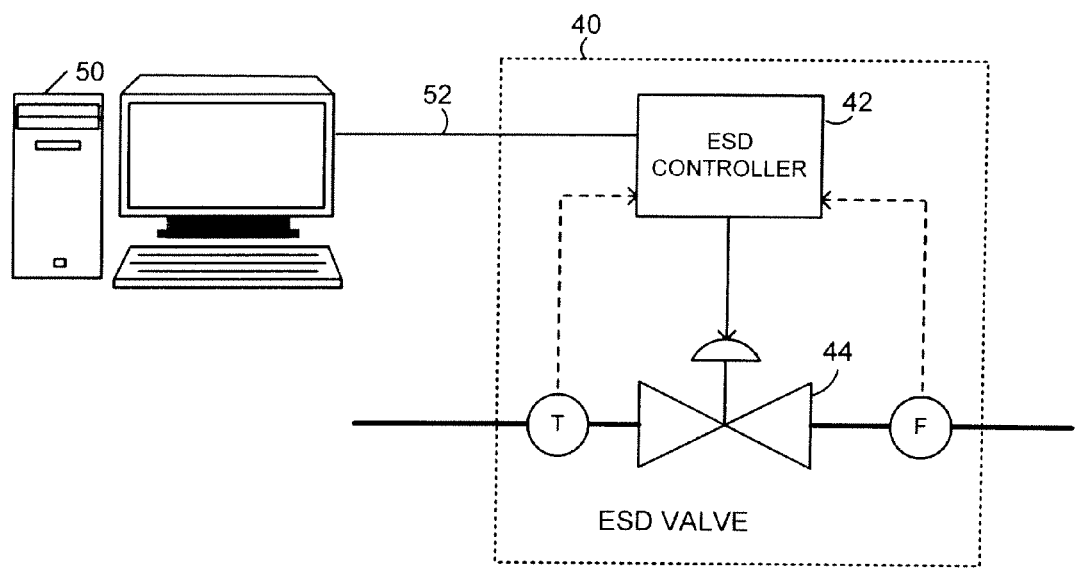
FIG. 1B is a diagram of another known system in which a partial stroke test of ESD valve is initiated from a remote workstation coupled to the ESD valve via a wired link of a communication network.

In another known configuration depicted in FIG. 1B, an ESD assembly 40 similarly includes in ESD controller 42 controlling an ESD valve 44 and one or more sensors. The ESD assembly 40 is coupled to an operator workstation 50 via a wired network connection 52. The workstation 50 is disposed at a remote site, and accordingly allows operators to access the ESD valve 44 remotely. However, the configuration depicted in FIG. 1B still requires wiring and, sometimes, rewiring when a portion or the entirety of the ESD assembly 40 is upgraded.

It is also possible to use a portable wired device such a Field Communicator manufactured by Emerson Electric Co., for example, to directly access an ESD assembly via a wired communication port, for example. Although generally more convenient for an operator that a stationary console (such as the operator console 12) and, in some cases, a workstation (such as the workstation 50) that provides remote network access to the ESD assembly, a portable wired device still requires that certain electronic components of the ESD assembly be exposed. In some environments (e.g., those that involve hazardous applications), exposure of electronic components is associated with an impermissibly high risk.

Figure 2:
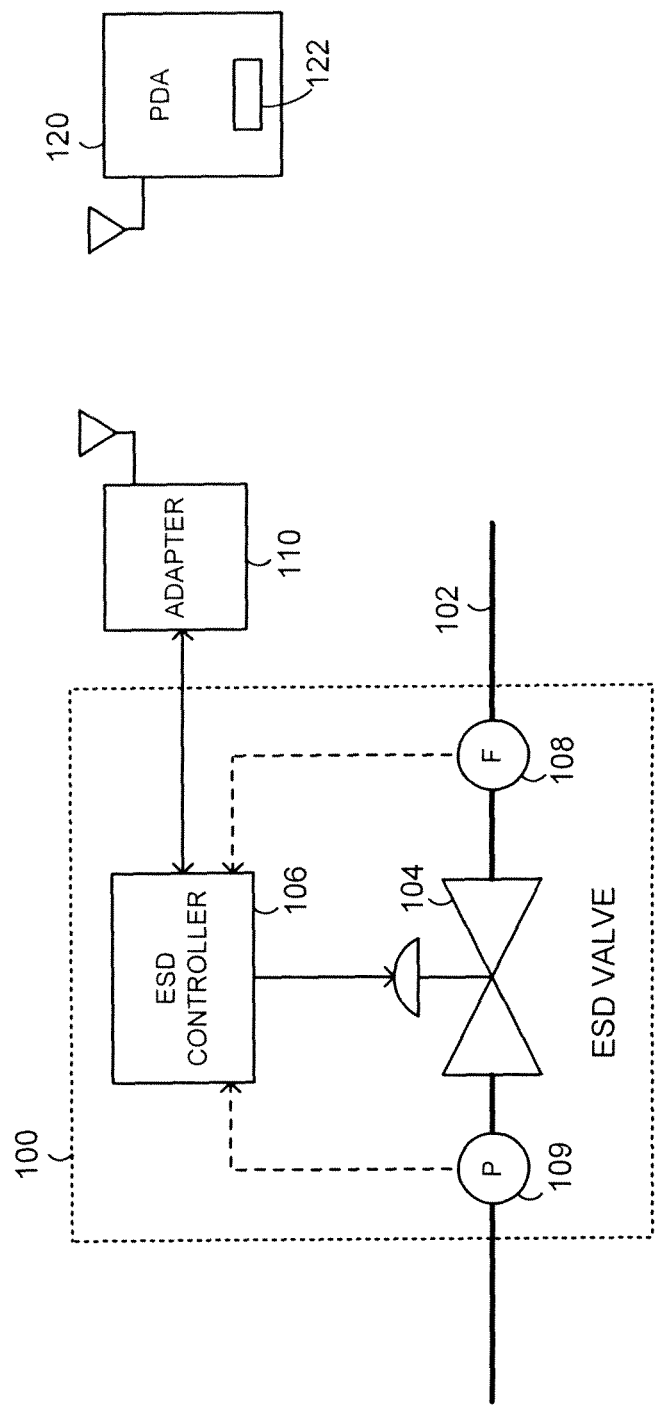
FIG. 2 is a diagram of an example system in which a partial stroke test of an ESD valve is initiated from a portable communicator coupled to the ESD valve via a wireless link.

Now referring to FIG. 2, in ESD assembly 100 is disposed in a pipeline 102 and may include components generally similar to those discussed above with reference to FIGS. 1A and 1B. In particular, the ESD assembly 100 in the illustrated embodiment includes an ESD valve 104 coupled to an ESD controller 106, a flow sensor 108 disposed upstream of the ESD valve 104, and a pressure sensor 109 disposed downstream of the ESD valve 104. In general, the ESD assembly 100 may include any suitable sensor configuration as well as other intelligent or non-intelligent components. Further, depending on the implementation, the components 104-109 are provided in a single assembly, as is the case in the example embodiment of FIG. 2, or as separate components interconnected in a wired manner or wirelessly (using radio frequency (RF) links, infrared (IR) links, etc.).

In an embodiment, the ESD controller 106 is configured to support an industrial automation protocol such as HART, Profibus, Foundation Fieldbus, etc. To receive and transmit commands according to the supported industrial automation protocol, the ESD controller 106 is communicatively coupled to an wireless adapter 110 that includes an antenna and, in at least some cases, a processor. In some embodiments, the wireless adapter 110 is integral with the ESD assembly 100, while in other embodiments, the wireless adapter 110 is provided separately for mounting on a suitable ESD assembly, for example. The wireless adapter 110 may be configured to transmit and receive commands according to a certain wireless communication protocol. In an embodiment, the wireless adapter 110 operates using a general-purpose short-range wireless protocol such as Bluetooth or a similar Institute of Electrical and Electronics Engineers (IEEE) 802.15 standard (e.g., version 802.15.1 ratified in 2005), for example. In operation, commands of the industrial automation protocol are layered over a portion of the Bluetooth communication stack. To this end, the ESD controller 106 may include drivers (or other software, firmware, or hardware components) configured to transmit commands of the industrial automation protocol and/or processing commands of the industrial automation protocol using Bluetooth or another general-purpose wireless communication protocol. More specifically, the ESD controller 106 may include components that provide the timing, synchronization, and other features necessary to operate according to the industrial automation protocol.

The ESD controller 106 may be associated with an SIS system of a process plant. In an embodiment, the ESD controller 106 is a Fisher FIELDVUE™ digital valve controller, and the wireless adapter 110 is a 775 THUM™ adapter, each manufactured by Emerson Electric Co.

An operator may utilize a wireless portable communication device 120 (for simplicity, "the wireless device 120") to interact with the ESD assembly 100 and, more particularly, to initiate and/or monitor the progress of a partial stroke test. In an embodiment, the device 120 is a smartphone. In another embodiment, the wireless device 120 is a PDA. In yet another embodiment, the wireless device 120 is a wireless field communicator specifically adapted for use in a process control environment. Depending on the embodiment, the wireless device 120 may support a general-purpose wireless communication protocol to establish a wireless condition link with the wireless adapter 110 and/or a wireless industrial automation protocol such as WirelessHART, for example. In the latter case, the wireless device 120 and the adapter 110 may form a WirelessHART communication network and define respective nodes of the network.

The wireless device 120 may further include an input device such as a keyboard, a mouse, etc. and an output device such as a display, as discussed in more detail with reference to FIG. 4. In an embodiment, a software module 122 resides in the memory of the communication device 120 and is configured to at least initiate a partial stroke test via a wireless link between the wireless device 120 and the ESD assembly 100. In an embodiment, the software application 122 supports one or several valve control and diagnostics functions. The software application 122 may include a component adapted to layer commands of an industrial automation protocol (e.g., HART) over a general-purpose wireless communication protocol (e.g., Bluetooth). In another embodiment, the wireless device 120 includes a separate software component such as a driver to support messaging consistent with the industrial automation protocol using the general-purpose wireless communication protocol.

Figure 3:
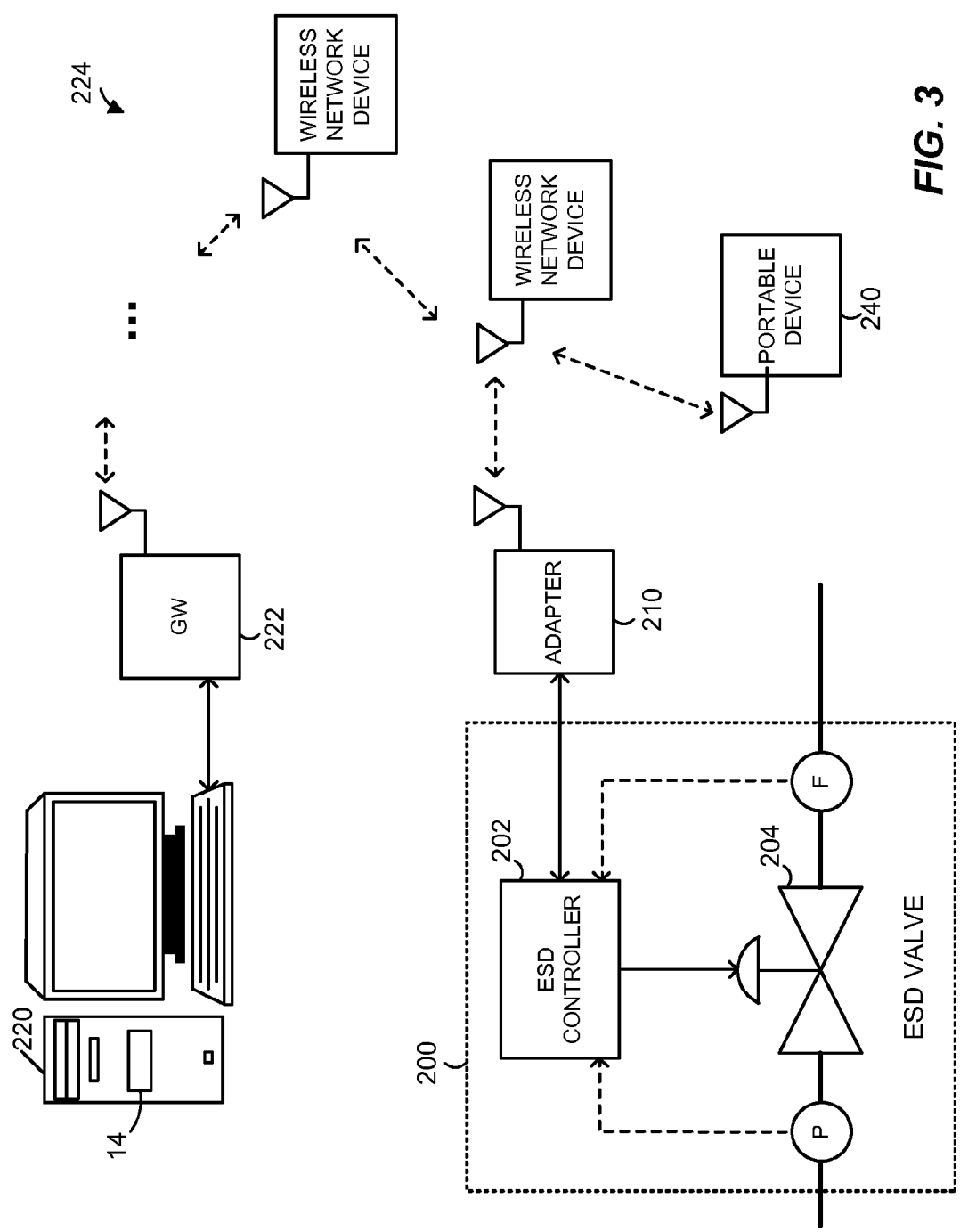
FIG. 3 is a diagram of another example system in which a partial stroke test of an ESD valve is initiated from a remote workstation coupled to the ESD valve via a wireless network.

Referring to FIG. 3, in ESD system 200 is generally similar to the ESD system 100 illustrated in FIG. 2. However, in ESD controller 202 is coupled to a wireless protocol adapter 210 that operates according to a wireless industrial automation protocol such as WirelessHART, wireless Fieldbus, etc. Similar to the wireless adapter 110 discussed above, the wireless protocol adapter 210 may be provided as a component of the ESD system 200 or separately for mounting on the ESD system 200 or otherwise coupling to the ESD controller 202. In the system depicted in FIG. 3, a user operates a workstation 220 that is coupled to a wireless gateway to 222 via which the workstation 220 communicates with a wireless network 224. The wireless network 224 may be a mesh wireless industrial communication network that includes several network devices, at least some of which provide a multi-hop communication path between the wireless gateway 222 and the adapter 210. In another embodiment, the wireless gateway 222 and the adapter 210 are connected by a direct wireless link, accordingly defining a one-hop communication path.

In the embodiment of FIG. 3, an operator may use the workstation 220 to access the ESD controller 202 and the ESD valve 204 via one or several direct (i.e., extending between a pair of devices) wireless communication links. Unlike a wired communication network, a wireless communication network generally is easier to form or adjust when devices are added to or deleted from the network, for example. In another configuration, the operator may utilize a portable communicator 240 that operates as anode in the wireless network 224 and connects to the adapter 210 via one or more intermediate links. The portable communicator 240 may be similar to the wireless device 120 or, in other embodiments, may be a wireless device specifically to operate in the wireless network 224. In another embodiment, the portable communicator 240 is a laptop computer equipped with an adapter for communicating on the wireless network 224 and the necessary driver to support the communication protocol used by the wireless network 224.

Figure 4:
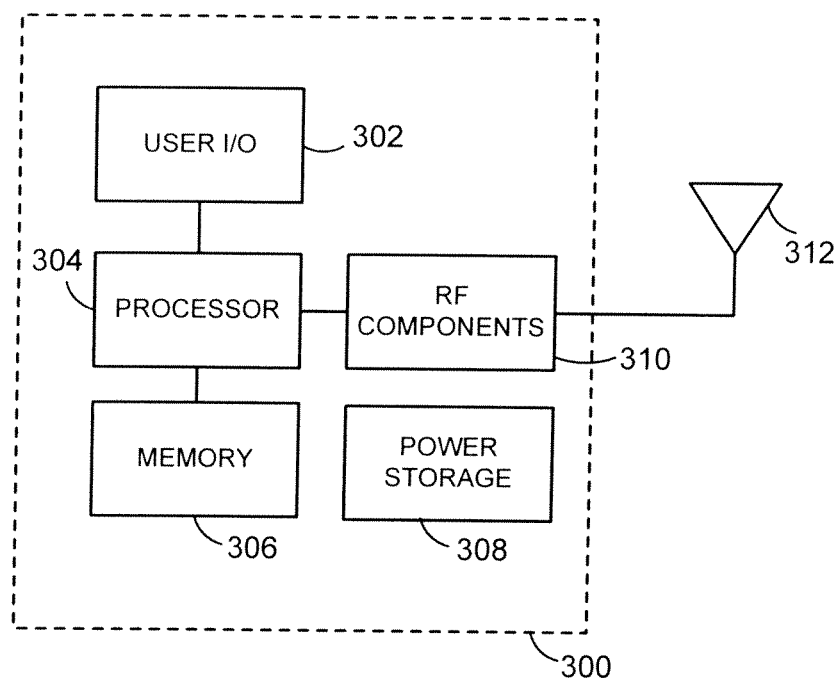
FIG. 4 is a block diagram of an example portable device that can be used to initiate a partial stroke test in the system depicted in FIG. 2.

Next, FIG. 4 illustrates an example wireless portable communication device 300 that can be used in a communication system such as the one illustrated in FIG. 2 or FIG. 3, for example. In an embodiment, the device 300 is used as the wireless device 120. The device 300 includes a user interface 302 that in turn may include an input device such as a keyboard, a mouse, a trackball, a touchscreen, etc. and an output device such as a screen, an audio unit, etc. Further, the device 300 may include a processor 304 to execute instructions stored in a memory 306 that may include one or several of a persistent data storage component (e.g., a hard drive), a random-access memory (RAM) unit, a read-only memory (ROM) unit, etc. In general, the memory 306 may be any suitable type of a machine-accessible medium on which instructions are stored. Alternatively, in another embodiment, the processor 304 includes an application-specific integrated circuit (ASIC).

The device 300 also may include an RF component module 310 such as a Bluetooth transceiver or a WirelessHART transceiver, for example, and a power storage unit 308 such as a battery. The RF component module 310 may be coupled to an antenna 312. In general, the device 300 may be implemented using any suitable combination of software, hardware, and firmware components. Referring back to FIG. 2, the software module 122 may at least partially reside in the memory 306 to be executed by the processor 304.

Figure 5:
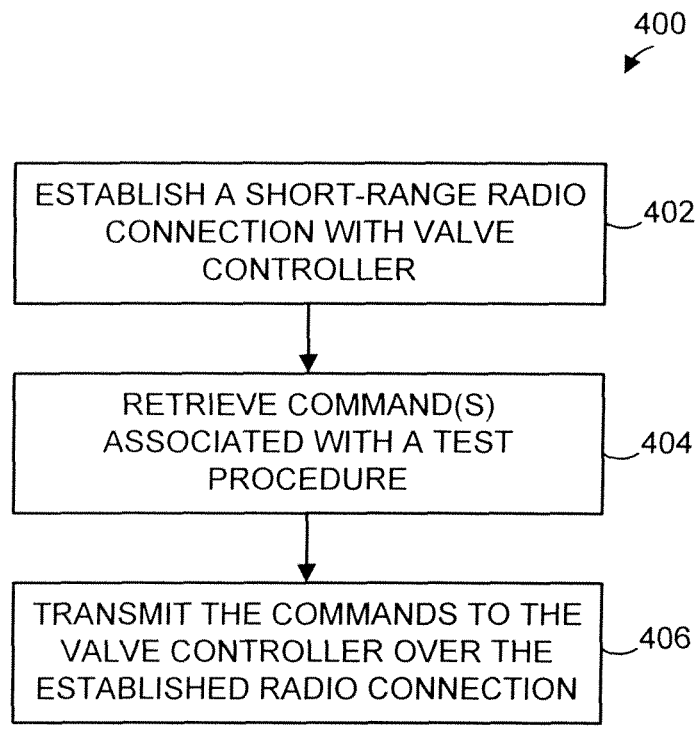
FIG. 5 is a flow diagram of an example method for establishing a wireless link between a portable device and an ESD valve to initiate a partial stroke test.

Referring to FIG. 5, an example method 400 for establishing a wireless link between a portable device and an ESD valve, so that a partial stroke test can be initiated and/or conducted using the wireless link, may be implemented in a wireless portable communication device such as the device 120 or 300, for example. At block 402, a short-range wireless communication link, such as an RF link or an IR link, is established. The established wireless communication link may be a direct link between a device in which the method 400 is implemented and an ESD controller such as the ESD controller 106. At block 404, a set of one or several commands associated with a partial stroke test are retrieved. For example, the commands may be stored in the memory 306.

In an embodiment, the set of commands to be transmitted to the ESD valve includes such commands as a command to advance the valve stem to a certain position, a command to report the current sensed position of the valve stem, a command to report the flow rate sensed by a sensor associated with an ESD assembly, etc. In another embodiment, the set of commands includes a command to trigger a partial stroke test procedure stored and implemented by an ESD controller within the ESD assembly. In other words, the logic of a partial stroke test may be implemented by an ESD controller, the portable or stationary device used by the operator, each of the ESD controller and the device used by the operator, or distributed between the ESD controller and the device used by the operator.

With continued reference to FIG. 5, the retrieved set of one or several commands is transmitted to the ESD controller over the wireless communication link at block 406. As discussed above, the commands may be transmitted using a general-purpose wireless communication protocol, a wireless industrial automation protocol, or another suitable wireless protocol, and may accordingly include industrial automation commands (e.g., update the specified variable, report the specified variable, obtain device description information) or standard communication commands (read, write, etc.).

Figure 6:
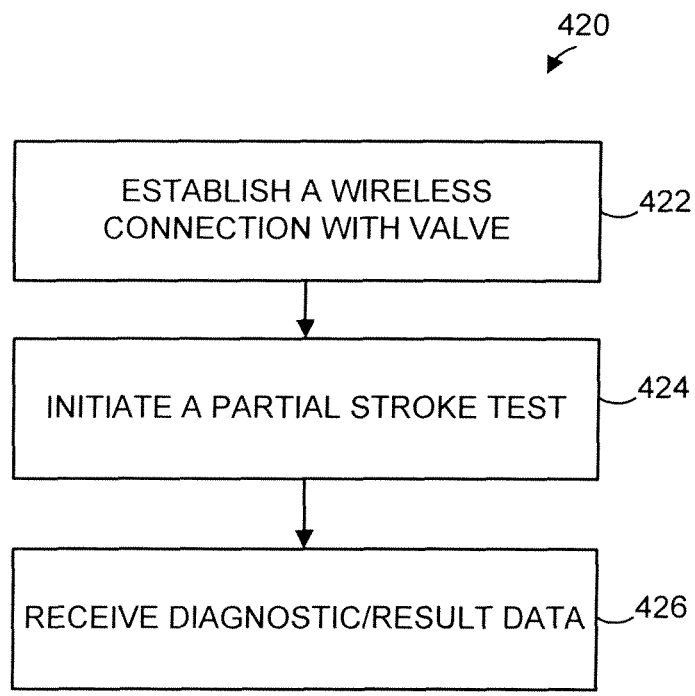
FIG. 6 is a flow diagram of an example method for wirelessly initiating a partial stroke test of an ESD valve and collecting diagnostic/status data from the ESD valve.

FIG. 6 is a flow diagram of an example method 420 for wirelessly initiating a partial stroke test of an ESD valve and collecting diagnostic/status data from the ESD valve. Similar to the method 400 discussed above, the method 420 may be implemented in a wireless portable communication device such as the device 120 or 300. At block 422, a wireless connection is established using a direct wireless communication link or a multi-hop path that includes several direct wireless communication links. Next, at block 424, a partial stroke test of the ESD valve is initiated. Data from the ESD valve indicative of the progress or the result of the partial stroke test is received at block 426. For example, the data may include positioning data reported by a position sensor and the corresponding timestamps. Using the received data, a device that executes the method 420 may develop trending data, for example, or generate a report that an operator may use to more fully analyze the operation of the ESD valve. Also, in some embodiments, the received data may be used to document that a partial stroke test has been conducted.

From the foregoing, it will be noted that the techniques discussed above allow operators to install devices such as valves as needed and incrementally expand process control networks, without having to provide wired network connections or direct wired connections to operator consoles, for example, or install multiplexers and other wired equipment. Further, these techniques significantly simplify installation as wireless components generally provide more flexibility than wired components.

In accordance with some of the embodiments discussed above, a user can initiate a partial stroke test locally, i.e., from a distance that allows her to observe the progress of the test, but nevertheless provides sufficient safety as it does not require a physical contact with the ESD assembly. Further, as discussed above, it is not necessary to expose any electronic components of ESD valves that are wirelessly accessible by operators. Thus, both operational safety and device maintenance may be improved.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for conducting a partial stroke test of an emergency shutdown valve, the method comprising:
   receiving a request to initiate the partial stroke test;
   establishing a wireless communication link with the emergency shutdown valve;
   generating a set of one or more commands to initiate the partial stroke test, wherein:
      the set of one or more commands is consistent with a digital industrial automation protocol,
      the set of one or more commands is transmitted to the emergency shutdown valve via the wireless communication link from a portable wireless device, and
      the emergency shutdown valve is not configured to receive commands to initiate the partial stroke test via a wired connection,
   receiving, from the emergency shutdown valve, (i) positioning data indicative of multiple positions of the emergency shutdown valve at various times during execution of the partial stroke test, and (ii) a result of the partial stroke test;
   generating timestamps corresponding to the multiple positions of the emergency shutdown valve during the partial stroke test based upon the positioning data; and
   generating a history of results from a plurality of executed partial stroke tests and their corresponding positioning data utilizing the timestamps associated with each of the plurality of executed partial stroke tests.

2. The method of claim 1, wherein the wireless communication link operates according to a general-purpose wireless communication protocol.

3. The method of claim 2, wherein the general-purpose wireless communication protocol is consistent with an Institute of Electronic and Electrical Engineers (IEEE) 802.15 standard.

4. The method of claim 2, wherein the set of one or more commands is layered over the general-purpose wireless communication protocol.

5. The method of claim 1, wherein:
   the digital industrial automation protocol is a wireless digital industrial automation protocol, and
   the wireless communication link operates according to the wireless digital industrial automation protocol.

6. The method of claim 5, wherein the wireless digital industrial automation protocol is a wireless Highway Addressable Remote Transducer (WirelessHART) protocol.

7. The method of claim 1, wherein the set of one or more commands includes a command determinative of a target position of the emergency shutdown valve.

8. The method of claim 1, wherein:
   the emergency shutdown valve is coupled to an emergency shutdown valve controller configured to execute a software routine to conduct the partial stroke test; and
   the set of one or more commands includes a command to trigger an execution of the software routine.

9. The method of claim 1, further comprising:
   receiving real-time data indicative of a progress of the partial stroke test.

10. An emergency shutdown test system, comprising:
    a valve controller, coupled to an emergency shutdown valve to control a positioning of the emergency shutdown valve; and
    a wireless communication module communicatively coupled to the valve controller and configured to:
       receive a command from a portable wireless device to initiate a partial stroke test of the emergency shutdown valve via a wireless communication link, wherein the command conforms to a digital industrial automation communication protocol;
       in response to the command, cause the valve controller to initiate the partial stroke test of the emergency shutdown valve, so that a positioning of the emergency shutdown valve changes during the partial stroke test, and
       send (i) positioning data indicative of multiple positions of the emergency shutdown valve at various times during execution of the partial stroke test, and (ii) a result of the partial stroke test to the portable wireless device,
    wherein:
       upon receiving the positioning data and the result of the partial stroke test, the portable wireless device generates timestamps corresponding to the multiple positions of the emergency shutdown valve during the partial stroke test,
       upon receiving the positioning data and the result of the partial stroke test from a plurality of executed partial stroke tests, the portable wireless device generates a history of results and their corresponding positioning data utilizing the timestamps associated with each of the plurality of executed partial stroke tests, and
       the valve controller is not configured to receive commands to initiate the partial stroke test via a wired connection.

11. The emergency shutdown test system of claim 10, wherein the wireless communication module is configured to operate according to a general-purpose wireless communication protocol.

12. The emergency shutdown test system of claim 11, wherein the general-purpose wireless communication protocol is consistent with an Institute of Electronic and Electrical Engineers (IEEE) 802.15 standard.

13. The emergency shutdown test system of claim 10, wherein the wireless communication module is configured to operate according to a wireless digital industrial automation protocol.

14. The emergency shutdown test system of claim 10, wherein the valve controller includes:
   a memory unit configured to store a routine to conduct the partial stroke test, and
   a processing unit configured to execute the routine in response to receiving the command via the wireless communication link.

15. The emergency shutdown test system of claim 10, further comprising:
   a sensor configured to detect at least one of:
      (i) a position of the emergency shutdown valve,
      (ii) an upstream pressure of a fluid flowing through the emergency shutdown valve, and
      (iii) a downstream pressure of the fluid flowing through the emergency shutdown valve.

16. The emergency shutdown test system of claim 15, wherein the valve controller is configured to:
   (i) receive data from the sensor during the execution of the partial stroke test, and
   (ii) cause the data to be transmitted via the wireless communication link.

17. The emergency shutdown test system of claim 16, wherein:
   the command is a first command, and
   the valve controller causes the data to be transmitted via the wireless communication link in response to receiving a second command via the wireless communication link.

18. The emergency shutdown test system of claim 11, wherein the wireless communication module is further configured to operate according to a wireless digital industrial automation protocol and to receive the set of one or more commands from the portable wireless device as a digital industrial automation communication protocol command layered over the general-purpose wireless communication protocol.

19. The emergency shutdown test system of claim 11, wherein the wireless communication module is further configured to operate according to a wireless digital industrial automation protocol and to receive the set of one or more commands from the portable wireless device as a message consistent with the industrial automation protocol using the general-purpose wireless communication protocol.

20. The emergency shutdown test system of claim 10, wherein the portable wireless device is:
   a laptop computer,
   a smartphone,
   a personal digital assistant (PDA), or
   a wireless field communicator.

21. A non-transitory machine-accessible medium having instructions stored thereon that, when executed, cause a portable wireless device to:
   process a request to initiate a partial stroke test of an emergency shutdown valve;
   establish a wireless communication link between the portable wireless device and an emergency shutdown assembly that includes the emergency shutdown valve;
   generate a set of one or more commands to initiate the partial stroke test, wherein:
      the set of one or more commands is consistent with a digital industrial automation protocol,
      the set of one or more commands is transmitted to the emergency shutdown assembly via the wireless communication link from the portable wireless device, and
      the emergency shutdown valve is not configured to receive commands to initiate the partial stroke test via a wired connection, and
   receive, from the emergency shutdown valve, (i) positioning data indicative of multiple positions of the emergency shutdown valve at various times during execution of the partial stroke test, and (ii) a result of the partial stroke test;
   generate timestamps corresponding to the multiple positions of the emergency shutdown valve during the partial stroke test based upon the positioning data; and
   generate a history of results from a plurality of executed partial stroke tests and their corresponding positioning data utilizing the timestamps associated with each of the plurality of executed partial stroke tests.

22. The non-transitory machine-accessible medium of claim 21, wherein the request to initiate the partial stroke test of the emergency shutdown valve is received from a user interface of the portable wireless device.

23. The non-transitory machine-accessible medium of claim 21, wherein the wireless communication link operates according to a wireless communication protocol consistent with an Institute of Electronic and Electrical Engineers (IEEE) 802.15 standard.

* * * * *

UNITED STATES PATENT AND TRADEMARK OFFICE
CERTIFICATE OF CORRECTION

PATENT NO.        : 9,080,683 B2                                Page 1 of 1
APPLICATION NO.   : 13/029939
DATED             : July 14, 2015
INVENTOR(S)       : Perry K. Carter et al.

It is certified that error appears in the above-identified patent and that said Letters Patent is hereby corrected as shown below:

On the Title Page:

At item (56), on page 1, under "OTHER PUBLICATIONS", line 1, "PCT/US201/065163," should be -- PCT/US2011/065163, --.

In the Specification:

At Column 5, line 47, "anode" should be -- a node --.

Signed and Sealed this
Third Day of May, 2016

Michelle K. Lee
*Director of the United States Patent and Trademark Office*